No. 629,379. Patented July 25, 1899.
W. H. LEWIS.
PHOTOGRAPHIC TRIPOD.
(Application filed Mar. 18, 1899.)

(No Model.)

Witnesses
Edward C. Rowland
D. S. Ritterband

Inventor
William H. Lewis
By his Attorney
Phillips Abbott

THE NORRIS PETERS CO., PHOTO-LITHO., WASHINGTON, D. C.

UNITED STATES PATENT OFFICE.

WILLIAM H. LEWIS, OF HUNTINGTON, NEW YORK, ASSIGNOR OF ONE-HALF TO THE E. & H. T. ANTHONY & COMPANY, OF NEW YORK.

PHOTOGRAPHIC TRIPOD.

SPECIFICATION forming part of Letters Patent No. 629,379, dated July 25, 1899.

Application filed March 18, 1899. Serial No. 709,631. (No model.)

*To all whom it may concern:*

Be it known that I, WILLIAM H. LEWIS, a citizen of the United States, and a resident of Huntington, in the county of Suffolk and State of New York, have invented a new and useful Improvement in Photographic Tripods, of which the following is a specification, reference being had to the accompanying drawings, in which—

Figure 1:
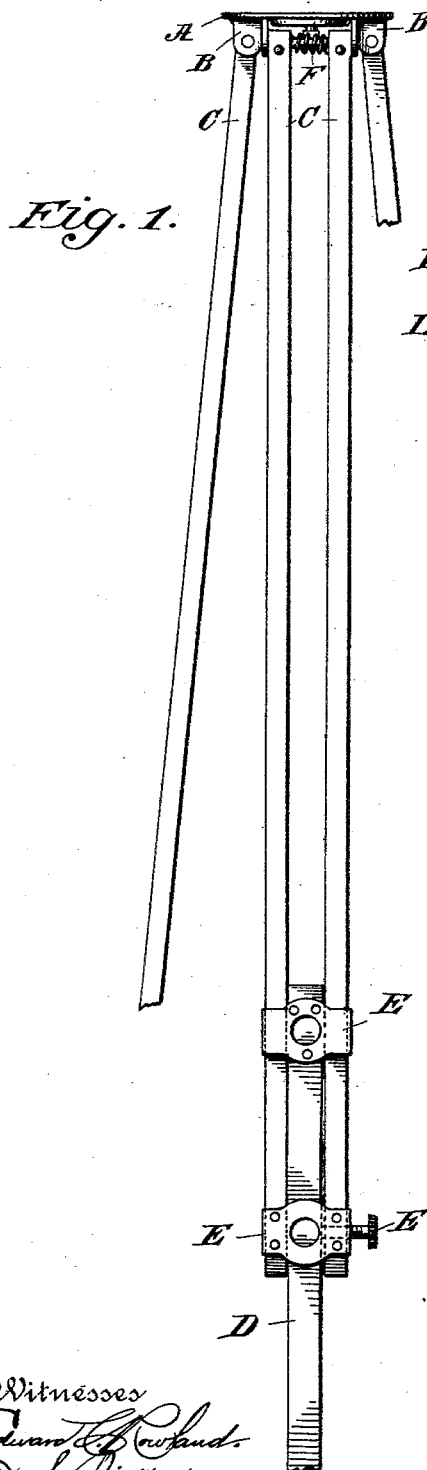
Figure 2:
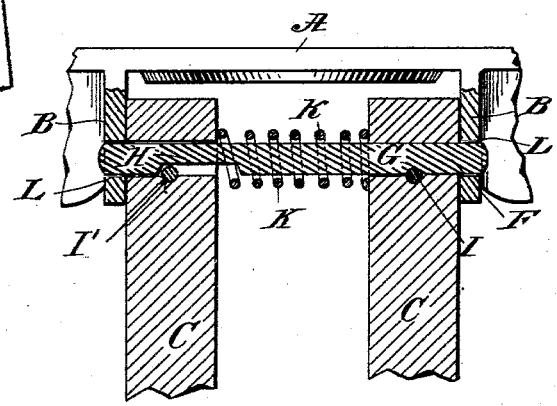
Figure 3:
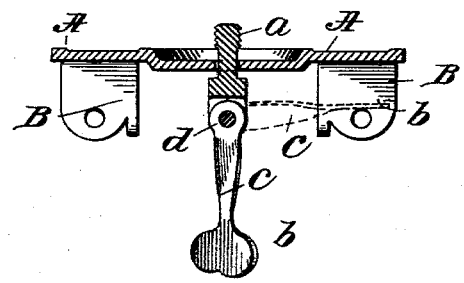

Figure 1 represents an elevation of a tripod embodying my invention, the legs being broken off. Fig. 2 illustrates a view, partly in section, of the upper ends of one of the legs, showing its engagement with the table, &c. Fig. 3 illustrates a view, partly in section, of the thumb-screw whereby the camera is attached to the tripod.

The purpose of this invention is to insure greater stability in camera-tripods and also to insure against accidental disconnection between the legs and the table thereof, thus overcoming certain objections found to exist in many forms of tripods as heretofore made.

Under my invention the parts composing the upper sections of the legs of the tripod are made to engage with considerable rigidity against the ears or equivalent devices attached to the under side of the table of the tripod, so that a large proportion of the disturbing agencies, such as the blowing of the wind, &c., will be resisted and the camera maintained in a stationary position.

A illustrates the upper part or table of the tripod.

B B are the duplex journal-plates for the legs, which may be attached to the table A in the usual manner.

C C are the two parts of the upper section of the legs usual in such apparatus.

D is the extendible section of the leg.

E E are the plates (usually metal) connecting the extendible section D with the upper section C C in the usual manner, E' being the set-screw to confine the sliding section D, as desired.

It will be understood that the extendible part of the leg may be made in one or more sections, as desired.

F is the axis for the leg of the tripod. It is provided with a transverse notch or groove G (see Fig. 2) near one end and with an elongated groove or depression H near the other end. It passes transversely through the upper ends of the parts C C composing the upper section of the leg, as shown, and pins or small nails I I' are driven through the upper sections of the leg in such manner that the pin I shall enter the notch G, formed in the axis F, and the pin I' shall enter the elongated notch H in the opposite end of the axis.

K is a spring (preferably, but not necessarily, coiled, as shown) which is located between the parts C C of the upper sections of the legs encompassing the axis F. Any other form of spring suitably arranged may be employed instead of the form specified.

The journal-plates B B have holes L L made through them, in which the axis F of the legs are journaled.

The operation of my invention is as follows: To engage the legs with the table A, the extendible sections D of the legs are first extended more or less to permit the parts C C of the upper sections of the legs to approach each other. Then the parts C C are pressed toward one another, compressing the spring K, during which operation the cross-pin I' travels longitudinally through the elongated notch H, made in the axis F, whereupon one end (preferably the left-hand end) of the axis F is entered into the appropriate hole L of the journal-plates B, and if the compression of the parts be sufficient the right-hand end can then be brought into proper registration with the hole L in the right-hand journal-plate B. Thereupon, the pressure being released, the spring K will force the two parts C C of the upper section of the leg apart, so that they will engage with considerable force against the inner surfaces of the journal-plates B B in such manner that a very considerable degree of rigidity will be given to the structure, for the reason that the power of the spring K is applied directly at the axes of the legs and conveyed through them to the journal-plates B B of the table. Thus a stiff or measurably rigid connection between the legs and the table of the tripod is secured and no loss or disarrangement of the parts is possible, because the axis F and also the spring which spreads the legs are both permanent parts of the legs and always maintain their position ready for operation; also, one hand only is necessary to operate the device, and since under my preferred construction the spring encircles the axis no buckling of it is possible. The construction is simple, durable, and inexpensive.

In Fig. 3 I illustrate an improvement in the form of the screw which connects the camera with the table. *a* is the screw, and *b* the thumb-nut whereby the screw *a* is turned. The thumb-nut *b* is made of sheet metal, and the shaft *c* thereof is given a half-turn. It is connected with the screw *a* by a pivot *d*, so that it may be folded at right angles to said screw. By reason of the fact that the shaft *c* of the thumb-nut is given a half-turn when folded it rests flatly against the under side of the table between the journal-plates B. So compactness is secured.

It will be obvious to those who are familiar with this art that various modifications may be made in the details of construction of my invention. For example, as heretofore stated, the spring K may be made in different form and differently arranged. The journal-plates B may also be differently constructed and the details of construction of the axis F may be modified, and in other respects the details shown may be altered without departing from the essentials of the invention.

I claim—

1. In a photographic tripod the combination of journal-plates on the table of the tripod, an axis-bar rigidly attached to the upper end of one of two parts composing the upper section of the legs and slidingly mounted in the other and extending beyond them laterally at each side, and a spring interposed between the upper ends of the parts composing the upper section of the legs and abutting against them, for the purposes set forth.

2. In a photographic tripod the combination of journal-plates on the table of the tripod, an axis at the upper ends of the parts composing the upper section of the legs of the tripod, having at one end a notch and at the other end an elongated depression or recess, pins passing through the parts composing the upper section of the legs engaging respectively with said notches or recesses in the axis, and a spring interposed between the upper ends of the parts composing the upper section of the legs, for the purposes set forth.

3. In a photographic tripod the combination of journal-plates on the table of the tripod, an axis at the upper ends of the parts composing the upper section of the legs of the tripod, having at one end a notch and at the other end an elongated depression or recess, pins passing through the parts composing the upper section of the legs engaging respectively with said notches or recesses in the axis, and a spring encompassing said axis, for the purposes set forth.

Signed at New York, in the county of New York and State of New York, this 16th day of March, A. D. 1899.

WILLIAM H. LEWIS.

Witnesses:
PHILLIPS ABBOTT,
D. S. RITTERBAND.